US008328979B2

United States Patent
Curet et al.

(10) Patent No.: US 8,328,979 B2
(45) Date of Patent: Dec. 11, 2012

(54) COMPOSITION FOR STRUCTURAL ADHESIVE

(75) Inventors: Arnaud Curet, Senlis (FR); Régis David, Chaville (FR)

(73) Assignee: Jacret, Le Thillay (FR)

( * ) Notice: Subject to any disclaimer, the term of this patent is extended or adjusted under 35 U.S.C. 154(b) by 385 days.

(21) Appl. No.: 12/593,650

(22) PCT Filed: Apr. 4, 2008

(86) PCT No.: PCT/EP2008/054097
§ 371 (c)(1),
(2), (4) Date: Jan. 15, 2010

(87) PCT Pub. No.: WO2008/125521
PCT Pub. Date: Oct. 23, 2008

(65) Prior Publication Data
US 2010/0116435 A1     May 13, 2010

(30) Foreign Application Priority Data

Apr. 5, 2007 (FR) ...................... 07 02485
Jul. 26, 2007 (FR) ...................... 07 05492

(51) Int. Cl.
*B32B 27/00* (2006.01)
*C08G 63/48* (2006.01)
*C08G 63/91* (2006.01)
*C08L 51/04* (2006.01)
*C08L 53/00* (2006.01)

(52) U.S. Cl. ............. 156/332; 156/334; 525/71; 525/89

(58) Field of Classification Search ............. 156/332, 156/334; 525/71, 89
See application file for complete search history.

(56) References Cited

U.S. PATENT DOCUMENTS

| | | | |
|---|---|---|---|
| 3,985,703 | A | 10/1976 | Ferry et al. |
| 4,304,709 | A | 12/1981 | Salee |
| 5,106,917 | A | 4/1992 | Lee et al. |
| 6,433,091 | B1 | 8/2002 | Cheng |
| 6,869,497 | B2 | 3/2005 | Doe et al. |
| 2005/0238603 | A1 | 10/2005 | Themens et al. |
| 2006/0155045 | A1 | 7/2006 | Tsuno et al. |

FOREIGN PATENT DOCUMENTS

| | | |
|---|---|---|
| EP | 1256615 A2 | 11/2002 |
| EP | 1431365 A1 | 6/2004 |

OTHER PUBLICATIONS

DuBois, Donn et al., "High Performance Styrenic Block Copolymers Featuring a Novel Hybrid Midblock Phase", Adhesives & Sealants Council Meeting, Louisville, KY, Oct. 9-12, 2005.

*Primary Examiner* — Michael Orlando
(74) *Attorney, Agent, or Firm* — Connolly Bove Lodge & Hutz LLP

(57) ABSTRACT

The invention relates to a composition for an acrylic structural adhesive containing a mixture of block copolymers, of elastomer and of elastomeric polymer particles.

14 Claims, No Drawings

COMPOSITION FOR STRUCTURAL ADHESIVE

RELATED APPLICATIONS

This application is a national stage application (under 35 U.S.C. §371) of PCT/EP2008/054097, filed Apr. 4, 2008, which claims benefit of French application 07/02485, filed Apr. 5, 2007 and French application 07/05492, filed Jul. 26, 2007.

FIELD OF THE INVENTION

The present invention relates to the field of acrylic structural adhesives (based on an acrylate or methacrylate) and to their applications.

BACKGROUND OF THE INVENTION

Structural adhesives are a good alternative to other mechanical techniques for binding two materials together, such as metals or plastics. This is because there is better force distribution by bonding than when alternative techniques such as riveting or welding are used. In addition, the use of bonding often allows more rapid working and also has the advantage of providing better insulation from external elements (dust, moisture) than mechanical technologies.

Structural adhesives are thus used in many industrial fields, even though they do have certain disadvantages. In fact, the bond created during the curing (setting) of the adhesive is often rigid when good mechanical strength is necessary. Thus, if the elasticity of the adhesive is insufficient, fracture may be observed when the two parts bonded together are made to undergo forces moving them apart. Adhesives having good elasticity do exist, but they are often of low mechanical strength.

It is therefore necessary to identify structural adhesives having both good mechanical strength (especially shear strength) and satisfactory elasticity. Moreover, it is important for these properties to be observed on various types of material, and especially on metal and on composites. Finally, it is important that these adhesives have a high viscosity so as to be able to be applied over great lengths on vertical or overhanging surfaces without slipping or flowing off before the application of the second surface to be adhered thereto. This phenomenon is particularly annoying when a long working time is necessary.

This slip phenomenon reduces for example the use of acrylic-based adhesives for applications requiring the adhesion of long objects to panels. The fact of trying to use these adhesives can increase the construction time or complicate the manufacturing process.

The development of adhesives for such a use would make it possible to simplify the methods requiring the adhesion of two large areas, to vary the construction materials and to speed up these methods.

SUMMARY OF THE INVENTION

The present invention aims to solve the abovementioned problems by providing an adhesive composition that can be used in a structural adhesive having an elongation at break equal to or greater than 80%, and a tensile shear strength greater than 10 MPa on aluminum. In addition, the adhesives according to the invention possess a rheology such that it is possible to apply a thickness of at least 3 to 5 mm, preferably at least 6 to 8 mm, of the adhesives according to the invention to a smooth vertical metal surface without said adhesives flowing off under the effect of gravity before the end of polymerization or curing.

The adhesives according to the invention consist of a composition according to the invention and of a second component containing a polymerization initiator (catalyst). The composition according to the invention is mixed with the second component on the vertical surface and the maximum thickness for which gravity does not make the adhesive collapse before curing is observed.

In general, the present invention enables the rheology of structural adhesives to be adjusted while maintaining a minimum elongation of 80%.

Structural adhesives are composed of two elements, namely a catalyst serving for polymerizing or curing the other element, which contains monomers.

The invention thus relates to a composition that can be used in a structural adhesive, comprising:
(a) at least one methacrylate ester monomer;
(b) at least one elastomeric block copolymer containing styrene and at least one second monomer;
(c) at least one elastomer chosen in such a way that its Hildebrand solubility parameter is compatible with the Hildebrand solubility parameters of the block copolymers used; and
(d) particles formed from a thermoplastic shell and an elastomeric core.

The composition according to the invention will thus be used with a curing catalyst.

DETAILED DESCRIPTION OF THE INVENTION

Preferably, the block copolymer (b) is chosen from a block copolymer containing styrene and isoprene, an elastomeric block copolymer containing styrene and butadiene or ethylene, and blends thereof.

In a preferred embodiment, the ester monomer (a) is a methacrylate monomer. It is preferred to choose a methacrylate monomer in which the alcohol part has a short linear chain (i.e. having one or two carbon atoms). Thus, the preferred monomers according to the invention are methyl methacrylate and ethyl methacrylate.

In another embodiment, the alcohol part has at least one ring, which may or may not be substituted. Thus, in this embodiment, the monomers may especially be chosen from: tetrahydrofurfuryl methacrylate, phenoxyethyl methacrylate, isobornyl methacrylate, glycidyl ether methacrylate, benzyl methacrylate, cyclohexyl methacrylate and trimethyl cyclohexyl methacrylate.

Mixtures of these esters may also be used. The percentage by weight of methacrylate in the composition is preferably between 20 and 80%, more preferably between 30 and 65% and even more preferably between 42 and 58%, i.e. around 50%.

In one particular embodiment, the composition also contains at least one acrylic ester monomer (e) in which the alcohol part has a linear chain of at least 6 carbon atoms (a long-chain monomer). Thus, it is preferred to use lauryl methacrylate, 2-ethylhexyl methacrylate, 2-ethylhexyl acrylate, esters based on polyethylene glycol, or mixtures of these esters. It is preferable for the composition to contain at most 10%, preferably at most 8% or even at most 5% by weight in total of these acrylic long-chain monomers. In one particular embodiment, the composition comprises a mixture of two acrylic long-chain ester monomers. Preferably, when the composition contains only a single acrylic ester monomer (e), it is preferable for this to be present in an amount of 8% by weight or less, although it is acceptable for there to be an amount of between 8 and 10% when the composition contains a mixture of these esters (e). In this case, it is preferred for each to be present in at most 5%.

The composition may also contain other monomers, such as acrylonitrile, methacrylonitrile or styrene.

The composition according to the invention also comprises one or more different block copolymers. Thus, it may contain a styrene-isoprene-styrene block copolymer (SIS), a block copolymer containing styrene and butadiene or ethylene, or blends thereof.

When the composition contains a block copolymer containing styrene and butadiene, it may be a styrene-butadiene-styrene copolymer (SBS) or a styrene/isoprene-butadiene/styrene copolymer (SIBS), such as Kraton MD6455 (from the company Kraton Polymers) described by Dr. Donn DuBois at al. at the conference Adhesives & Sealants Council Meeting, Louisville, Ky., 9-12 Oct. 2005.

When the composition contains a block copolymer containing styrene and ethylene, it may be an SEBS (styrene/ethylene-butylene/styrene copolymer) or an SEPS (styrene/ethylene-propylene/styrene copolymer). These compounds are available in the Kraton G range (from Kraton Polymers).

Preferably, styrene is present in a proportion of between 15 and 50%, more preferably between 22 and 40% and even more preferably about 28-33% by weight of the SBS copolymer. It is present in a proportion of between 12 and 24% and more preferably about 18-19% by weight in the SIS or SIBS copolymers.

When the composition contains a blend of two block copolymers (for example an SIS and an SIBS), the SIS/SIBS relative proportion preferably varies in a ratio of 4/1 (by weight in the composition) to 1.5/1. The preferred proportion of SIS to the second block copolymer is about 3/1 or 3.3/1. However, it is also possible to use an SIS/SIBS blend in the same relative proportions as the SIS/SIBS blend. It is also possible to use a blend of SIS, SIBS and SBS. Another block copolymer may also be added to one of these blends.

The block copolymers SIS, SBS or SIBS that can be used according to the invention are well known to those skilled in the art. They are produced in particular by the company Kraton Polymers (Houston, Tex., USA). Thus, it is possible to use the SIS Kraton D1160 disclosed in US 2005 0238603 or Kraton D1161, the SBS Kraton D1102 described in U.S. Pat. No. 5,106,917 and the SIBS Kraton MD6455 or Kraton MD 6460.

A person skilled in the art knows how to select other SIS, SIBS and SBS block copolymers that can be used in the composition according to the invention from those that exist, in particular according to their solubility in the monomers used, or according to their tensile strength.

Preferably, the composition according to the invention comprises between 5 and 30%, preferably between 12 and 25% and more preferably between 15 and 25% by weight of the elastomeric block copolymers.

In one particular embodiment, the composition according to the invention contains an elastomeric block copolymer containing styrene and isoprene and at least one elastomeric block copolymer containing styrene and butadiene, i.e. an SIS/SIBS blend, an SIS/SBS blend or an SIS/SIBS/SBS blend.

In another embodiment, the composition according to the invention contains a single elastomeric block copolymer containing styrene and isoprene, i.e. an SIS.

According to another embodiment, the composition according to the invention contains a single elastomeric block copolymer containing styrene and butadiene, chosen from an SIBS or an SBS.

The composition according to the invention also contains at least one elastomer chosen in such a way that it is compatible in solution with the block copolymer(s) used. If necessary, it is functionalized (having a double bond at its ends, in particular methacrylate functional groups to improve the bonding with the monomers). Preferably, a liquid elastomer is chosen. It is preferred to use at least one functionalized elastomer, either by itself or as a mixture with at least one non-functionalized elastomer.

In particular, it is chosen in such a way that its Hildebrand solubility parameter is compatible with the Hildebrand solubility parameters of the block copolymers used. The Hildebrand solubility parameter is well known and calculated by the square root of the cohesive energy density of the compound. In particular, the Hildebrand solubility parameter of the elastomer is between 8 and 9. Thus, it is preferred to use elastomers of the polybutadiene type (the polybutadiene then being preferably liquid and functionalized, for example with a vinyl terminal group, containing an ester group, such as Hycar VTB 2000×168 from Emerald Performance Materials (EPM), (Cuyahoga Falls, Ohio, USA) or Ricacryl 3801 from Sartomer) or polyisoprene type. A polychloroprene (Neoprene AD10, from DuPont, USA) may also be used. These elastomers may be used alone or as blends (thus, it is possible in particular to use a polychloroprene/(functionalized polybutadiene) blend or a (functionalized polybutadiene)/(non-functionalized polybutadiene such as Hycar CTB 2000×162 (EPM)) blend.

This component (c) is favorably present in an amount of between 4 and 20%, preferably between 6 and 15% and more preferably between about 8 and 12% by weight in the composition according to the invention.

The relative proportions of the block copolymer/elastomer blend are between 4/1 and 0.5/1, preferably about 2/1, by weight in the composition. However, it is also possible to have relative proportions of the order of about 0.5/1.

The composition according to the invention also contains elastomeric polymer particles. These particles are called "core-shell" particles in English, are well known to those skilled in the art, and are formed from a "hard" thermoplastic shell, preferably based on polymethylmethacrylate (PMMA) and from an elastomeric core which is generally butadiene-based, often copolymerized with styrene, or acrylic-based. Mention may in particular be made, for implementing the invention, of acrylonitrile-butadiene-styrene (ABS), methacrylate-butadiene-styrene (MBS) and methacrylate-acrylonitrile-butadiene-styrene (MARS) polymers and blends thereof.

These particles contain a crosslinked elastomeric core surrounded by thermoplastic shell, often a methyl-methacrylate polymer (PMMA). U.S. Pat. Nos. 3,985,703, 4,304,709, 6,433,091, EP 1 256 615 and U.S. Pat. No. 6,869,497 in particular describe such particles, which are thus well known to those skilled in the art.

In particular, impact-modifying particles are preferred, particularly MBS impact modifiers. In a preferred embodiment, these MBSs have slight cross-linking of the polymer forming the core. In addition, these MBSs, apart from their impact resistance, also preferably have shock-induced crack resistance.

Core-shell polymers are available from many companies. Thus, GE Plastics and Arkema (Paris, France) may be mentioned. The preferred particles are in particular of the Clearstrength C301, C303H, C223, 0350, 0351, E920 or C859 type from Arkema, C301 and C303H MBSs being preferred. It is also possible to use Durastrength D300 or D340 from Arkema, having an acrylic core surrounded by a PMMA shell. Likewise, it is also possible to use the MBSs developed by Rohm and Haas (Philadelphia, Pa., United States), especially Paraloid™ BTA 753.

These particles may be used by themselves or as a blend. Thus, in one particular embodiment of the invention, a blend of MBS (particularly C303H or C301) particles and particles having a PMMA shell and an acrylonitrile core (especially D340 particles) is used.

Preferably, these particles are present in the composition in an amount of between 2 and 20% by weight, preferably between 5 and 15% by weight, of the composition.

The composition according to the invention may also contain an acid monomer such as an acid monomer that can be polymerized by free radicals, known in the prior art, of the unsaturated carboxylic acid, maleic acid, crotonic acid, isophthalic acid and fumaric acid type. It is also possible to add isobornyl acrylate (IBXA), 2-hydroxyethyl methacrylate (HEMA), 2-hydroxypropyl methacrylate (HPMA), 2-(perfluorooctyl)ethyl acrylate (POA), tetrahydrofurfuryl acrylate (THFA) or isobutoxy-methacrylamide (IBMA). Mixtures of these compounds, especially an HEMA/HPMA mixture, may be added. Methacrylic acid or acrylic acid is preferred. Between 2 and 10%, preferably between 3 and 5%, of this compound are added.

As seen above, the composition according to the invention may also contain other elastomers, such as a polychloroprene, such as Neoprene AD10 (from Dupont, USA).

The composition according to the invention may also contain, in its preferred embodiments, at least one additional compound chosen from a curing accelerator, a rheology modifier and an adhesion promoter.

The curing accelerator serves to promote the polymerization and curing of the adhesive when the catalyst is added. This is a tertiary, preferably aromatic, amine such as dimethyl para-toluidine and/or 2,2'-(p-tolylimino) diethanol.

The rheology modifier serves to improve a good viscosity of the composition according to the invention, so that it can be easily applied to the surfaces to be bonded. Polyamides such as Disparlon 6200 or Disparlon 6500 (from Kusumoto Chemicals Ltd, Japan) may be used. This rheology modifier is typically used in an amount not exceeding 2 or 3% by weight of the composition.

Within the context of the composition according to the invention, it is preferable for the phosphate-ester-based adhesion promoter to be methacrylated. In particular, a phosphate-ester-adhesion promoter is used in which the ester is the ester 2-hydroxyethyl methacrylate phosphate. It may in particular be obtained under the name Genorad 40 (Rahn AG, Zurich, Switzerland). Such adhesion promoters are well known in the prior art and are described in particular in U.S. Pat. No. 4,223,115. Thus, the following may be mentioned: 2-methacryloyloxyethyl phosphate, bis-(2-methacryloyl-oxyethyl phosphate), 2-acryloyloxyethyl phosphate, bis-(2-acryloyloxyethyl phosphate), methyl-(2-methacryloyloxyethyl phosphate), ethyl-(2-methacryloyl-oxyethyl phosphate), a mixture of 2-hydroxyethyl methacrylate monophosphate and diphosphate esters (especially the one known under the name T-Mulz 1228 (Harcros Organics, Kansas City, US)) and similar compounds or derivatives.

Other components, such as mineral fillers ($TiO_2$, $CaCO_3$, $Al_2O_3$, zinc phosphate), ultraviolet stabilizers (such as 2-hydroxyphenyltriazine, Tinuvin 400 from Ciba-Geigy), paraffin and glass microbeads, may also be added to the composition according to the invention. Free-radical polymerization inhibitors, such as BHT, or benzoquinones such as naphthoquinone, hydroquinone or ethylhydroquinone may also be added to increase the lifetime of the composition.

It is known that structural adhesives are formed from two components, these being a composition according to the invention and a catalyst for curing and setting the adhesive. These two components are stored in two different compartments and are mixed together at the time of application of the adhesive. Such adhesives are also subjects of the invention.

This catalyst is a free-radical polymerization initiator, particularly a peroxide-based one, and is well known in the prior art. Benzoyl peroxide, tert-butylperoxybenzoate or cumene hydroperoxide may especially be chosen. It is preferred when the catalyst contains between 5 and 40% peroxide by weight, in particular about 20% peroxide by weight. A paste containing about 20% benzoyl peroxide is especially used.

The catalyst is used in a ratio from 1/1 to 1/30, preferably from 1/5 to 1/30 and even more preferably about 1/10 relative to the second component, which is the composition according to the invention.

The invention is therefore based on the fact that the combined use of an elastomeric block copolymer chosen from a block copolymer containing styrene and isoprene, an elastomeric block copolymer containing styrene and butadiene or ethylene, and blends thereof, a functionalized liquid elastomer chosen in such a way that its Hildebrand solubility parameter is compatible with the Hildebrand solubility parameters of said elastomeric block copolymers and elastomeric polymeric particles based on butadiene and styrene makes it possible to obtain a composition for a structural adhesive that has an elongation at break equal to or greater than 80%, and more preferably 100%, and a tensile shear strength equal to or greater than 10 MPa, 15 MPa or even 17 MPa (on aluminum), as well as a high viscosity. This shear strength may be adjusted by the added amount of adhesion promoters or acid monomers, as mentioned above.

This result is completely unexpected, since this adhesive thus has properties greatly superior to those described in the prior art. Thus, U.S. Pat. No. 6,433,091 suggests the use of core-shell polymers in structural adhesives and mentions MABS, MBS and ABS polymers. However, none of the compositions described in that patent comprises all the elements of the composition according to the invention.

Likewise, EP 1 256 615 is silent as to the shear strength of the adhesives described, the sole datum being greatly inferior to the properties of the compositions according to the invention.

Moreover, this adhesive also has excellent mechanical strength when it is used on a composite. In fact, it is commonly found that the mechanical strength values observed on a metal are not always repeated on a composite.

The use of a composition according to the invention therefore makes it possible to bond metals, plastics and composites to a composite and thus can be applied in particular in the field of silo, boat or truck trailer construction. It may be also used in the automotive construction field or the railroad field.

Thus, the composition enables a material to be adhesively bonded to another material, one or the other material being especially a metal, a plastic, wood or a composite. The composition may therefore be used in one or more of the following applications: metal/metal, metal/composite, metal/plastic, metal/wood, wood/plastic, wood/composite, wood/wood, plastic/composite, plastic/plastic or composite/composite adhesion.

The composition according to the invention is thus particularly advantageous when a material has to be bonded to a composite.

The flexible methacrylate structural adhesives having high mechanical performance obtained with the composition according to the invention are resilient and resistant to shocks and vibrations. They make it possible to produce adhesive joints between materials of the same or different chemical nature, for example: concrete, wood, ceramics, glass, ferrites, aluminum, anodized aluminum, steel, galvanized steel, stainless steel, painted metal, steel, copper, zinc, ABS, PVC, polyester, acrylics, polystyrene, gel-coat polyester or epoxides, composites, glass-fiber-reinforced composites, laminates, honeycomb structures and any painted or lacquered material.

They may also fill large gaps between substrates of different or variable thickness, roughness or flatness, with better stress distribution. This property is increased due to the rheology of the composition according to the invention.

The firmness of compositions according to the invention was measured using a principle derived from the principle of slump cones (also known as Abrams cones) with cones 4.5 cm in diameter. The Abrams cone method is used in particular in the cement and mortar field, making it possible to measure the slump of a concrete cone under the effect of its own weight. The greater this slump, the more fluid the concrete is deemed.

It has been observed that the slump of formulations according to the invention is slight, i.e. they hold together under the effect of their own weight. Thus, it may be considered that the adhesives obtained from the compositions according to the invention behave like mortars, as they have a pasty consistency. Owing to their pasty nature, these adhesives may be used as cements or mortars so as to fill the gap between two parts and to allow adhesion between two parts that are not in direct contact, while still maintaining the properties of thermoplastic adhesives, i.e. in particular the elasticity, that a mortar does not have.

Therefore, it is possible to produce large-area assemblies with particularly large gaps which hold together without slumping after assembly with relatively long setting times ranging from a few minutes to more than one hour. In particular, this is highly advantageous in nautical construction, with the production of deck-on-shell assemblies or fillet joints for bonding partitions together.

The compositions according to the invention also have a low shrinkage, in particular after joining a thermo-plastic to a polyester composite. The observed shrinkage with the compositions according to the invention is thus less than 2%, whereas the compositions of the prior art generally have a shrinkage of between 5 and 7%.

The consistency of the compositions according to the invention, together with their low shrinkage, therefore enables them to be easily used for obtaining particularly large adhesive joints.

Furthermore, the flexibility of this composition thus allows the differential expansion forces between the substrates to be taken up over great lengths of several meters, while reducing or eliminating geometrical (angle, roughness, flatness) defects.

In addition, the compositions according to the invention have a low exothermicity during curing. This is also favorable since excessively high exothermicity, especially when bonding an ABS thermoplastic (usable as reinforcement) to a polyester-based composite body, may stress the ABS and create bonding strains on the composite, which are visible after the painting cycle.

The applications and activity sectors involved comprise:

Bonding of reinforcements, rails, frame structures, beams, stiffeners, panels, partitions, fasteners, supports, body components, reinforcing brackets, inserts, cylindrical and conical components, hinges, frames, etc.; bonding with lamination take-up on partitions, bonding with filling, requiring high mechanical strength; especially bonding of any bonded structural or mechanical component from the following fields: shipbuilding, automotive, railroad (and infrastructure), aeronautical, aerospace, electronic, electromechanical and domestic electrical equipment, military structures, indicating (and advertising) signs and panels, urban furniture, exterior joinery (windows, glazed bays, window doors, entry doors and garage doors), wind machines, containers, engineering structures and infrastructures (suspension bridges, offshore oil platforms and aircraft hangars, etc.), construction and fastening, curtain walling and solar panels.

The teaching provided by the present invention makes it possible for a person skilled in the art to vary the viscosity of the composition according to the invention, while maintaining the mechanical performance such as the elongation at break (greater than 80%) or the shear strength.

To give an example, the following two types of composition fall within the scope of the invention, the relative proportions of the various components being able to be adjusted by a person skilled in the art.

Thus, the following composition formulation may thus be employed:
(a) methacrylate ester monomer (MMA): equal to or greater than 40%;
(b) elastomeric block copolymer (by itself or as a blend): between 15 and 21%;
(c) an elastomer (functionalized polybutadiene (VTB)): between 8 and 10%; and
(d) core-shell particles: between 2 and 15%.

The following are also added: monomers (e) in an amount of between 5 and 10%, Disparlon between 0 and 3%, acid monomers between 1 and 4% and Genorad between 0 and 3%.

It is also possible to use a composition formulation:
(a) methyacrylate ester monomer (MMA): equal to or greater than 40%;
(b) elastomeric block copolymer (by itself or as a blend): between 2 and 15%;
(c) between 8 and 10% of a functionalized poly-butadiene (VTB) optionally blended with between 3 and 10% of polychloroprene, or butadiene/acrylonitrile copolymer; and
(d) core-shell particles: between 10 and 25%.

The following may also be added: monomers (e) in an amount of between 5 and 10%, Disparlon between 0 and 3%, acid monomers between 1 and 4% and Genorad between 0 and 3%.

EXAMPLES

The examples below illustrate the invention without restricting the scope thereof.

Example 1

Raw Materials Used and Methodology

The following components were used:
methacrylate ester monomer (a): methyl methacrylate (MMA);
acrylate ester monomer (e): laurylmethacrylate (LauMA) and/or 2-ethylhexyl acrylate (2EHA);

SIS copolymer (b): Kraton D1160 (Kraton Polymers);
SBS copolymer (b): Kraton D1102 (Kraton Polymers); or
SIBS copolymer (b): Kraton MD6455 (Kraton Polymers);
functionalized liquid elastomer (c): Hycar® VTB 2000×168 (Noveon, USA) (functionalized polybutadiene);
elastomeric polymeric particles (d): Clearstrength C301 (Arkema), Clearstrength C303H, Durastrength D340 (Arkema), Paraloid BTA 753 (Rohm and Haas);
acid monomer: methacrylic acid (MAA);
adhesion promoter: phosphate methacrylate Genorad 40 (Rahn AG);
curing accelerator: dimethyl-para-toluidine (DMPT) and/or dihydroxyethyl-para-toluidine (DHEPT);
rheology modifier: Disparlon 6200, Disparlon 6500 (Kusumoto Chemicals);
catalyst: benzoyl peroxide at 20% ADERIS 1003 (Jacret, France);
and
nitrile/butadiene elastomer: Chemigum P83 (Eliokem, France).

The tests according to the following protocols were carried out:
- the ISO 527 standard was used to carry out the tests for measuring the tensile strength TS, the elongation at break EB and the elastic modulus or Young's modulus YM.
- The elongation was observed using a method well known to those skilled in the art described in particular by the ISO 527 standard, the pull rate of the adhesive being a constant 50 mm/min;
- the tensile shear strength (SS) was measured according to the ISO 4587 standard. Briefly, 2024T3 aluminum test pieces measuring 100×25×1.6 mm (L×W×T) were used. Two test pieces were bonded to each other, the overlap area being 25×12 mm (300 mm²), with an adhesive joint thickness of about 200 to 400 μm. The force needed to break the adhesive joint was then measured by pulling on the two test pieces; and
- the tensile peel strength (PS) was evaluated according to the ISO 14173 standard. Aluminum test pieces measuring 100×25×1.5 mm or galvanized steel test specimens measuring 100×25×0.8 mm were used, these being bonded with an overlap of 75×25 mm and an adhesive joint thickness of about 500 μm.

The viscosity of the adhesives is evaluated by the thickness of adhesive which it is possible to apply to a vertical surface without observing downward slip.

Adhesion to a composite: The bonding test was carried out by adhesion of galvanized steel to a polyester gel-coat. The adhesion quality was rated according to the following convention:
++=very good; +=moderate; −=poor Results Specimens containing a blend of two elastomeric block copolymers (b) and an elastomer (c) with or without particles (d) were tested.

|  | Specimen | | | | | |
|---|---|---|---|---|---|---|
|  | 1 | 2 | 3 | 6 | 5 | 4 |
| MMA | 50.2 | 46.2 | 51 | 46 | 54 | 50 |
| Kraton D1160 | 16 | 16 | 16 | 15 | 16 | 16 |
| Kraton MD6455 | 5 | 5 | 5 | 5 | 5 | 5 |
| VTB 2000×168 | 10 | 10 | 10 | 10 | 10 | 10 |
| C301 | — | 5 | — | 5 | — | 4 |
| 2EHA | 8.8 | 8.8 | 8 | 9 | 5 | 5 |
| MAA | 5 | 4 | 4 | 4 | 4 | 4 |
| Genorad 40 | 3 | 3 | 3 | 3 | 3 | 3 |
| DMPT | 1 | 1 | 1 | 1 | 1 | 1 |
| Disparlon 6500 | 1 | 1 | 2 | 2 | 2 | 2 |
| Total (by weight) | 100 | 100 | 100 | 100 | 100 | 100 |

The results obtained were the following:

|  | Specimen | | | | | |
|---|---|---|---|---|---|---|
|  | 1 | 2 | 3 | 6 | 5 | 4 |
| SS (MPa) on aluminum | 20.5 | 18.7 | 19.2 | 18.3 | n.c.o. | 20.5 |
| PS (N/mm) on aluminum | 17.3 | 15.4 | 14.3 | 13 | n.c.o. | 15.5 |
| PS (N/mm) on galvanized steel | 17.5 | 16.7 | 19.6 | 15 | n.c.o | 15.3 |
| TS (MPa) | 9.6 | 10.1 | 9.8 | 9.6 | 11.1 | 10.5 |
| EB (%) | 251 | 189.8 | 156.3 | 202 | 84.6 | 151.1 |
| YM (MPa) | 95.7 | 118.5 | 150 | 104.6 | 201.8 | 164.4 |
| Thickness (mm) | 1-2 | 3-5 | 2-4 | 6-9 | 2-4 | 8-11 |
| Gel-coat adhesion | + | ++ | n.c.o. | ++ | ++ | + | n.c.o.: not carried out.

These results demonstrate that the presence of elastomeric particles (d) makes it possible to increase the viscosity of adhesives (measured by the thickness of the layer that can be applied without flowing) with no appreciable reduction in shear strength or in elongation at break.

Similar results were observed when other block copolymers (SIS+SBS) were blended.

Compounds containing a single block copolymer (b) were also tested:

|  | Specimen | | | | | | |
|---|---|---|---|---|---|---|---|
|  | 8 | 9 | 10 | 11 | 12 | 13 | 14 |
| MMA | 54 | 50 | 50 | 54 | 50 | 54 | 50 |
| Kraton D1102 | — | — | — | 21 | 21 | — | — |
| Kraton D1160 | — | — | — | — | — | 21 | 21 |
| Kraton MD6455 | 21 | 21 | 21 | — | — | — | — |
| VTB 2000×168 | 10 | 10 | 10 | 10 | 10 | 10 | 10 |
| C301 | — | 5 | 4 | — | 4 | — | 4 |
| 2EHA | 5 | 5 | 5 | 5 | 5 | 5 | 5 |
| MAA | 4 | 4 | 4 | 5 | 4 | 5 | 4 |
| Genorad 40 | 3 | 3 | 3 | 3 | 3 | 3 | 3 |

-continued

| | Specimen | | | | | | |
|---|---|---|---|---|---|---|---|
| | 8 | 9 | 10 | 11 | 12 | 13 | 14 |
| DMPT | 1 | 1 | 1 | 1 | 1 | 1 | 1 |
| Disparlon 6500 | 2 | 1 | 2 | 1 | 2 | 1 | 2 |
| Total (by weight) | 100 | 100 | 100 | 100 | 100 | 100 | 100 |

The results obtained were the following:

| | Specimen | | | | | | |
|---|---|---|---|---|---|---|---|
| | 8 | 9 | 10 | 11 | 12 | 13 | 14 |
| SS (MPa) on aluminum | 22 | 20 | 22.2 | 22 | 21.4 | 21.1 | n.c.o. |
| PS (N/mm) on aluminum | 16.7 | 13 | 16.6 | 12.4 | 14.9 | 20.5 | n.c.o. |
| PS (N/mm) on galvanized steel | 13.1 | 13.5 | 16.8 | 8.9 | 18.7 | 17.2 | n.c.o. |
| TS (MPa) | 10.5 | 10.9 | 11 | 12.4 | 12.4 | 9.4 | 11.5 |
| EB (%) | 86.5 | 128.8 | 140.4 | 43.2 | 146.3 | 50.2 | 87.3 |
| YM (MPa) | 178.6 | 175.6 | 177.8 | 268 | 228.3 | 173.8 | 210.2 |
| Thickness (mm) | 2-4 | 3-5 | 6-9 | 1-2 | 6-9 | 1-2 | 6-9 |
| Gel-coat adhesion | ++ | ++ | ++ | + | ++ | + | n.c.o. |

It is clearly apparent that the combined presence of components (b), (c) and (d) makes it possible to maintain excellent tensile shear strength, to improve the elongation at break (elasticity), and to increase the viscosity. It should also be noted that the observed peel strength and tensile strength results are maintained.

Various elastomeric core-shell particles were also tested:

| Specimen | 15 | 16 | 17 |
|---|---|---|---|
| MMA | 46 | 46 | 45.1 |
| Kraton MD6455 | 21 | 21 | 18.9 |
| Kraton D1160 | — | — | — |
| VTB 2000x168 | 10 | 10 | 9 |
| Neoprene AD10 | — | — | — |
| C303H | — | 10 | — |
| D340 | 10 | — | 14 |
| BTA 753 | — | — | — |
| 2EHA | 5 | 5 | 5 |
| Lauryl MA | — | — | — |
| MAA | 4 | 4 | 4 |
| Genorad 40 | 3 | 3 | 3 |
| DMPT | 1 | 1 | 1 |
| Disparlon 6500 | 0 | 0 | 0 |
| Total (by weight) | 100 | 100 | 100 |

The following results were obtained:

| Specimen | 15 | 16 | 17 |
|---|---|---|---|
| SS (MPa) on aluminum | 22.1 | 23.5 | 20.0 |
| TS (MPa) | 9.7 | 10 | 9.9 |
| EB (%) | 127.9 | 97.0 | 97.2 |
| YM (MPa) | 200.1 | 165.6 | 170.2 |
| Thickness (mm) | 8-11 | 14-18 | 18-20 |
| Gel-coat adhesion | ++ | ++ | ++ |

Other formulations containing a blend of block copolymers (b) were also tested.

| | Specimen | | | | | | |
|---|---|---|---|---|---|---|---|
| | 19 | 20 | 21 | 22 | 23 | 24 | 25 |
| MMA | 53.72 | 55 | 43.3 | 40.3 | 40.3 | 44.3 | 44.3 |
| Kraton D1160 | — | 5 | 15 | 15 | 15 | 16 | 16 |
| Kraton MD6455 | 7.14 | 15 | 5 | 5 | 5 | 5 | 5 |
| VTB 2000x168 | 8.2 | 10 | 10 | 10 | 10 | 10 | 10 |
| 2EHA | 4.1 | — | 5 | 5 | 5 | 5 | 5 |
| Lauryl MA | 5.1 | 1 | 5 | 5 | 5 | 5 | 5 |
| C303H | 15.3 | 10 | — | 15 | — | — | — |
| D340 | — | — | 15 | — | — | 10 | — |
| BTA 753 | — | — | — | — | 15 | — | — |
| MAA | 2 | 1 | 1 | 1 | 1 | 1 | 1 |
| DHEPT | — | — | 0.5 | 0.5 | 0.5 | 0.5 | 0.5 |
| DMPT | 0.3 | 1 | 0.2 | 0.2 | 0.2 | 0.2 | 0.2 |
| Neoprene AD10 | 4.14 | — | — | — | — | — | — |
| Chemigum P83 | — | — | — | — | — | — | 10 |
| Disparlon 6500 | — | 2 | — | 3 | 3 | 3 | 3 |
| Total (by weight) | 100 | 100 | 100 | 100 | 100 | 100 | 100 |

The following results were obtained:

| | Specimen | | | | | | |
|---|---|---|---|---|---|---|---|
| | 19 | 20 | 21 | 22 | 23 | 24 | 25 |
| TS (MPa) | 7.2 | 5.5 | 6.4 | 7 | 6.1 | 6.2 | 3.2 |
| EB (%) | 132.8 | 103.5 | 180.2 | 291 | 210.3 | 199.8 | 130.3 |
| YM (MPa) | 108.1 | 54.3 | 111.6 | 102.3 | 78.9 | 116.9 | 35.5 |
| Thickness (mm) | 15-20 | 12-16 | 20-25 | 20-25 | 20-25 | 20-25 | 10-15 |

These results show that the use of an NBR is not as effective as the particles (d) used within the context of the invention.

All these results demonstrate that by blending elements (a), (b), (c) and (d) it is possible to obtain an adhesive having a high viscosity, while maintaining a good elongation at break.

The invention claimed is:

1. A composition that can be used in a structural adhesive, comprising:
    (a) 20-80% by weight of at least one methacrylate ester monomer;
    (b) 15-25% by weight of at least one elastomeric block copolymer selected from the group consisting of styrene-isoprene-styrene block copolymers (SIS) and block copolymers containing styrene and butadiene or ethylene;
    (c) 6-15% by weight of at least one elastomer, wherein said elastomer is polybutadiene; and (d) 5-15% by weight of particles formed from a thermoplastic shell and an elastomeric core.

2. The composition as claimed in claim 1, wherein said elastomeric block copolymer is a blend of at least one styrene-isoprene-styrene block copolymer ISIS) and at least one block copolymer containing styrene and butadiene or ethylene.

3. The composition as claimed in claim 1, wherein said elastomeric block copolymer is selected from the group consisting of styrene-isoprene-styrene (SIS), styrene-butadiene-styrene (SBS) and styrene-isoprene-butadiene-styrene (SIBS) copolymers and blends thereof.

4. The composition as claimed in claim 1, wherein said elastomer (c) is selected from the group consisting of non-functionalized or functionalized polybutadiene and blends of these elements.

5. The composition as claimed in claim 1, wherein said composition comprises between 8 and 12% of said elastomer (c) by weight.

6. The composition as claimed in claim 1, wherein said particles (d) are selected from the group consisting of acrylonitrile-butadiene-styrene, methacrylate-butadiene-styrene, methacrylate-acrylonitrile-butadiene-styrene and methacrylate-acrylonitrile particles and the mixtures thereof.

7. The composition as claimed in claim 1, wherein said composition further comprises at least one acrylate ester monomer in which the alcohol part has at least one linear chain of at least 6 carbon atoms (e).

8. The composition as claimed in claim 7, wherein said one acrylate ester monomer (e) is a methacrylate or acrylate monomer.

9. The composition as claimed in claim 7, wherein said composition contains a mixture of two acrylate monomers (e).

10. The composition as claimed in claim 7, wherein said composition comprises less than 10% by weight of acrylate monomer (e).

11. The composition as claimed claim 1, wherein said composition further comprises polychloroprene.

12. The composition as claimed in claim 1, wherein said composition further comprises at least one additional compound selected from the group consisting of a curing accelerator, a rheology modifier, an adhesion promoter and an acid monomer.

13. A method for the preparation of a composition that can be used as a structural adhesive having an elongation at break equal to or greater than 80% and a rheology enabling a thickness of at least 3 to 5 mm of said composition to be applied to a vertical surface without it flowing under the effect of gravity comprising combining at least one methacrylate ester monomer; at least one elastomeric block copolymer selected from the group consisting of styrene-isoprene-styrene block copolymers (SIS) and block copolymers containing styrene and butadiene or ethylene; at least one elastomer, wherein said elastomer is polybutadiene; and particles formed from a thermoplastic shell and an elastomeric core to form a composition, wherein said composition comprises 20-80% by weight of said at least one methacrylate ester monomer; 15-25% by weight of said at least one elastomeric block copolymer selected from the group consisting of styrene-isoprene-styrene block copolymers (SIS) and block copolymers containing styrene and butadiene or ethylene; 6-15% by weight of said at least one elastomer, wherein said elastomer is polybutadiene; and 5-15% by weight of said particles formed from a thermoplastic shell and an elastomeric core.

14. A method for adhesively bonding one material to another material comprising adhesively bonding one material to another material with a composition as claimed in claim 1.

* * * * *